Jan. 5, 1954     M. M. KINLEY ET AL     2,665,187
DEVICE FOR MAKING PERMANENT RECORDS
Filed April 15, 1949     2 Sheets-Sheet 2
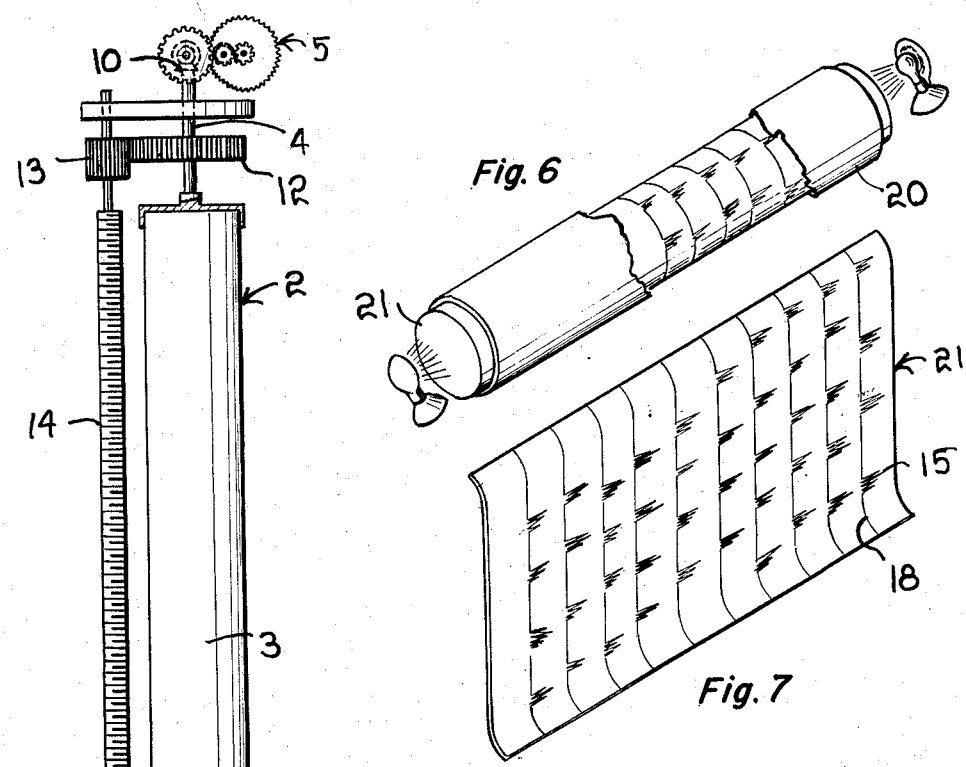
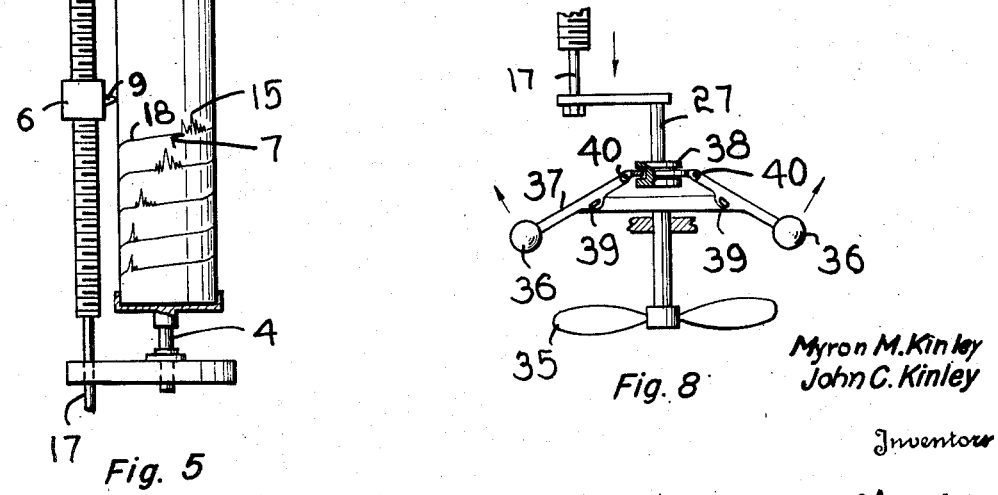
Myron M. Kinley
John C. Kinley
Inventors
By Lester B. Clark
& Ray L. Smith
ATTORNEYS Patented Jan. 5, 1954

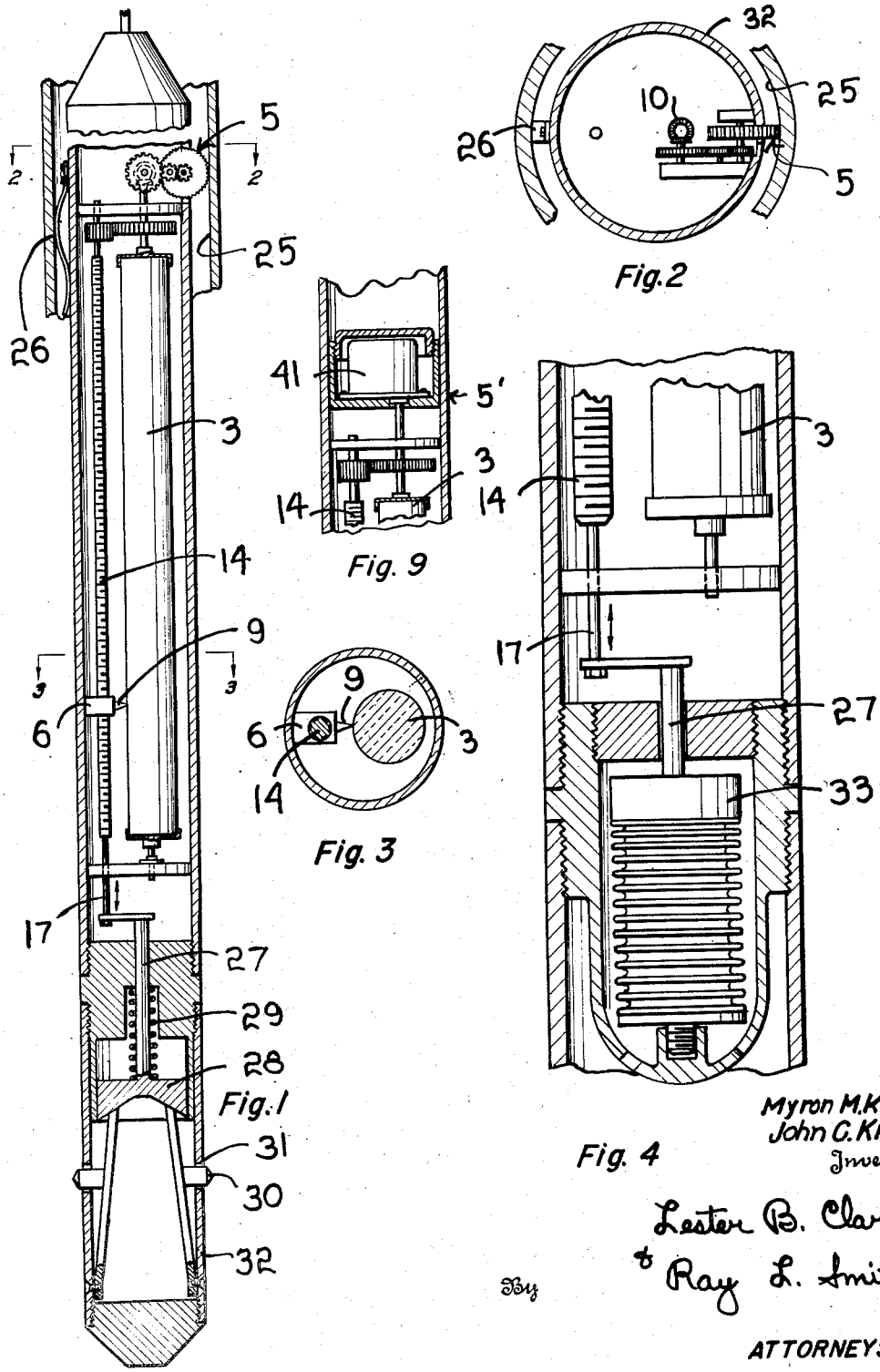

2,665,187

UNITED STATES PATENT OFFICE 2,665,187

DEVICE FOR MAKING PERMANENT RECORDS

Myron M. Kinley and John C. Kinley, Houston, Tex.

Application April 15, 1949, Serial No. 87,728

5 Claims. (Cl. 346—108)

The invention relates to an apparatus for forming a permanent record.

An object of the present invention is to provide a device whereby a permanent record may be formed, which record may thereafter be quickly and easily reproduced any number of times.

Another object of the invention is to provide a device for forming permanent records of different phenomena or characteristics in a well bore containing fluids which do not interfere with the operation of the device or with the record being formed.

Still another object of the invention is to provide the combination with a tool which indicates variations in measurements being made, a device for recording such variations including, a chart formed of light-transmitting, transparent or translucent substance, with means to drive said chart, and tracing means operatively connected to such tool for making a graph on said chart as an indication of variation in the measurements being made.

Still another object of the invention is to provide a device for locating and recording pits and irregularities internally of a tubular elongated object, such as a pipe.

Still another object of the invention is to provide a device for forming records on a light-transmitting or conductive substance so that reproductions of the record formed may be made by passing the light through such translucent or transparent material to a light-sensitive material or paper.

It is also an object of the invention to provide an internal recording caliper particularly adapted for investigating pipe such as drill pipe, tubing, and casing in wells.

Still another object of the invention is to provide a method of making a permanent record wherein an impression is formed on the surface of a translucent or transparent chart and thereafter exposing such chart to light whereby the imprinted portion of said chart diffuses the light and glows, so that a record may be obtained of the imprinted portion by placing a light-sensitive medium adjacent the chart whereby the impressions thereon are reproduced on the medium.

A still further object of the invention is to provide in a device for forming a permanent record, a chart element in the form of a plastic rod which preferably has a highly polished surface and upon which suitable impressions may be made so that when light is passed through the rod the impressions will glow and diffuse the light and react upon light-sensitive paper placed adjacent the rod.

Still another object of the invention is to provide in a tool for measuring variations in the diameter of elongated objects, contact members arranged on said device to contact the object being measured and a recording device operatively connected with said contact whereby variation in the diameter of the object will be transmitted through the recording device to a chart in the tool.

Still another object of the invention is to provide a method of forming an original impression from which any number of copies may be reproduced.

A still further object of the invention is to provide a method of forming an original impression on a template member by scribing or roughing the polished surface of such member so that any number of copies may be made by passing light through the member onto photosensitive material.

A still further object of the invention is to provide a method of forming an original impression on a master by scribing or roughing the polished surface of the master, from which any number of copies may be made by passing light through the master onto photo-sensitive material whereby a picture of the impressions is reproduced on the material.

Yet a further object of the invention is to provide a device for recording variations from which reproductions thereof may be made including, a chart formed of transparent or translucent material, means to drive said chart, and tracing means operatively connected to said tool for making a graph on said chart as an indication of variation in the measurements being made, the chart being of a material to transmit light therethrough whereby said reproductions may be formed on light-sensitive material placed adjacent said chart.

Other and further objects and advantages will become more readily apparent from a consideration of the following description and drawings, wherein:

Figure 1 is a vertical sectional view, partly in elevation, illustrating the invention in combination with a device for measuring variations internally of a tubular object;

Fig. 2 is a sectional view on the line 2—2 of Fig. 1, and illustrates a form of the driving means for the recording mechanism;

Fig. 3 is a sectional view taken on the line 3—3 of Fig. 1, and illustrates a form of tracing means associated with the recording mechanism;

Fig. 4 is a vertical sectional view, partly in elevation, showing a form of the invention in combination with a device for measuring variations in pressure;

Fig. 5 is a vertical elevational view illustrating a form of the invention;

Fig. 6 illustrates a method of reproducing the graph on the chart;

Fig. 7 is a vertical elevational view showing a record which has been reproduced from the original chart;

Fig. 8 is an elevational view illustrating a form of the invention to measure flow; and Fig. 9 is a vertical sectional view illustrating an alternate form of driving mechanism for the device.

A form of the invention is illustrated generally at 2 in Fig. 5. A chart or chart element 3 is arranged on a frame 4, which chart is driven by any suitable means, such as the gearing arrangement illustrated at 5. A stylus 6 is also driven by the gearing arrangement 5 and is adapted to engage the chart 3 to produce a graph thereon, as illustrated at 7.

The chart 3 may be formed of any suitable transparent or translucent material which preferably has a highly polished surface and which is soft enough so that an impression may be made on the surface thereof by the point 9 on the stylus or member 6. It is also to be noted that while the chart is shown as being in a tubular or rod form, it may assume any desired configuration so long as reproductions of the graph on the chart 3 may be readily and easily obtained. As used herein, the terms "transparent material," and "translucent material" are meant to denote a material having the property of transmitting light rays longitudinally thereof without any appreciable deflection or diffusion of said light rays at an angle to the direction of projection of said rays. As specific examples of such materials, the plastic material "Lucite" and glass have been found satisfactory.

While it is believed that the operation of the recording device is fully apparent from the drawings, by way of amplification it will be assumed that suitable means are provided to rotate the gear mechanism 5 which is connected to a gear 10 on one end of the frame 4. In this manner rotation may be imparted to the cylinder or chart 3. Also mounted on the frame 4 is a gear 12, which drives the gear 13 mounted on the threaded shaft 14. The threaded shaft 14 is slidably mounted with respect to the cylinder 3 so that longitudinal movement thereof will be indicated on the chart 3 by a pip or a plurality of pips as illustrated at 15.

The member or stylus 6 is restrained from rotation, and since the point 9 is engaged against the chart 3, rotation of the threaded shaft 14 by the gear 12 simultaneously with rotation of the chart 3 moves the stylus longitudinally along the threaded shaft 14.

The lower end 17 of the threaded shaft 14 may be operatively connected to any type device or tool which indicates variation in measurements. Such tool may be so constructed and so connected to the end 17 of the shaft 14 that any variation in the measurements being made will cause the shaft 14 to move longitudinally with respect to the chart 3. As previously mentioned, such longitudinal movement will be indicated on the chart 3 in the form of a pip or a plurality of pips, as shown at 15.

In this manner the recording device may be used with any type of measuring or indicating apparatus for recording variations in the indications or measurements being made. It seems obvious, of course, that so long as the shaft 14 is not moved longitudinally with respect to the chart 3, spiral lines, as shown at 18, will be formed on the chart as rotation is imparted to both the chart 3 and the shaft 14, causing the stylus 6 to move up the shaft.

In order to reproduce the graph from the chart 3, a light-sensitive medium or material, as shown at 20 in Fig. 6, may be wrapped around the cylinder or chart 3. Light may be passed through the ends 21 of the chart or cylinder, whereupon the graph on the surface will diffuse such light and cause the chart to glow around the graph. Such light will be, in turn, transmitted to the light-sensitive medium or material, whereupon a reproduction may be had, as shown generally at 21 in Fig. 7.

It seems obvious, of course, that any suitable type of stylus or tracing means 6 could be provided to form an impression or graph on the chart 3, and any suitable driving means could be provided to coordinate the driving of the chart 3 with the movement of the stylus or tracing means 6. Additionally, any desired arrangement could be had whereby the recording device can be operatively connected to a tool so as to record variations or fluctuation in measurements being made without necessarily departing from the scope of the invention.

As previously mentioned, the chart 3 may be formed of any suitable material which will transmit light rays, such as glass, plastic, or the like. Plastics have been found quite satisfactory in use. Of course, the material must be of such nature that it will permit the making of photographic or other records. It is preferable that the material evenly transmit light from a source placed adjacent its ends, or if the chart is hollow, then the walls thereof should evenly transmit the light from a source therein so as to obtain a true reproduction. Actually the chart element has a highly polished surface and has the property of transmitting light rays which are projected axially thereof without any substantial deflection or diffusion of said rays in directions transversely of the chart. Thus, prior to the marking of the chart by the point 9 the light rays which are projected longitudinally of the chart are substantially invisible; however, when the point 9 of the stylus 6 scribes the line or graph 7 the surface of the chart is grooved or indented and thereafter when the light rays passing longitudinally of the chart strike the indentation or groove, said light rays are deflected and diffused in a direction transversely of the chart and such rays become visible through the scribed line or graph. It is these deflected light rays which pass outwardly through the indentation or groove which strike the light-sensitive material 21 to produce the reproduction shown in Figure 7.

The form of the invention illustrated in Fig. 5 is shown in Fig. 1 as being associated with a calipering device as disclosed in our copending application Tubing and Casing Caliper, Serial No. 785,212, filed November 12, 1947, now Patent No. 2,638,681, May 19, 1953. As shown in Fig. 1, the gearing mechanism 5 is arranged to contact the interior 25 of a tubular object which is being calipered. A spring arrangement 26 urges the gearing mechanism 5 against the interior of the tubular object so that as the tool is moved therethrough, the chart 3 will be driven, while simultaneously therewith movement of the stylus or tracing means 6 on the threaded shaft 14 will be effected. The lower end 17 of the threaded shaft 14 is engaged to a rod 27 connected with a plunger 28. Fitting about the rod 27 is a spring 29 which tends to resiliently hold the plunger 28 in engagement with the ends of the contact members 30.

Arranged below the plunger 28 are a plurality of contact members 30 extending laterally through openings 31 in the body 32 of the well-calipering tool. The contact members 30 may be resiliently urged outwardly and into engagement with the interior 25 of a tubular object.

So long as the interior diameter of the tubular object is normal, the contact members will not move laterally with respect to the housing 32 and the recording device will indicate merely a smooth spiral line, as illustrated at 18 in Fig. 5; however, movement of the contact members 30 laterally of the housing moves the plunger 28, which movement is in turn transmitted through the rod 27 to the threaded shaft 14. Longitudinal movement of the shaft 14 and the tracing means 6 thereon causes a pip or a plurality of pips at 15, depending upon the number of times the shaft is moved longitudinally with respect to the chart 3. It is, therefore, readily seen that the instant invention is directed to a device that can be used in combination with a caliper tool for recording the interior condition or variation in diameter of tubular objects, such as the occurrence of pits or corroded areas in oil well pipe.

As a practical matter, it has been found from investigating well pipe in a well that a cylinder or chart 3 approximately one foot in length can be calibrated so as to serve in making a record of variations in the measurements of tubular objects up to lengths of 5,000 or 6,000 feet.

Additionally, it is to be noted that the recording device need not be protected from any fluids which may be contained in the tubular object being measured or calipered.

Fig. 4 illustrates the invention in combination with a tool for measuring variations in pressure. To this end there is connected on the rod 27, bellows 33 and associated spring, which is connected to the rod 27 and shaft 14 so that if the bellows and spring are collapsed, the shaft 14 will be moved longitudinally to form a pip or impression 15 on the chart. The spring may be calibrated to indicate variations in pressure by the amount of its collapse. For example, if the pip is, say, $\frac{1}{16}''$ high, this will indicate a depression of, say, one inch of the spring, which will indicate a pressure of so many pounds.

Fig. 8 illustrates a form of the invention which may be adapted to measure volumetric flow. A spinner 35 may be connected to the weights 36 on arms 37 which are rotatably mounted at 38 in the lower end 17 of rod 14. The flow of fluids will impart rotation to the spinner 35 and weights 36. It seems obvious that any surge or sudden change in flow will move the weights 36 in an arc about the pivot connection 39 between the arms 37 and spinner 35. This moves the ends 40 of the arms 37 up or down, which in turn moves the rod 14 longitudinally to make a pip on 3.

An alternate form of the driving means 5 is indicated at 5' in Fig. 9. As previously mentioned, the device can be driven by any suitable means; and a clock mechanism 41 is shown as being connected to the chart 3 and rod 14 in Fig. 9 to drive them.

Recording devices in accordance with the invention may be adapted to any number of different uses and may be combined with any type instruments wherein it is desired to measure variations from a predetermined measurement being made. If desired, the method of the instant invention can be used to make a master of any type design, impression, indication, or the like, from which master copies may be quickly and easily obtained. The impression on the chart 3 can be readily reproduced by passing a light through the chart onto light-sensitive paper placed adjacent thereto so that the impression upon the chart will be reproduced upon the light-sensitive medium.

The device has been found to be particularly advantageous for use in oil well tools in view of the fact that no measures need necessarily be taken to protect the working parts of the tool from the corrosive fluids of the well. Additionally, the construction and diameter of the recording device are such that it will readily adapt itself so that it may be used in a well bore of an oil well.

Broadly the invention contemplates a device for recording measurements, impressions, and indications, or the like, the construction and arrangement of the device being such that reproductions of the record made may be easily and quickly obtained.

What is claimed is:

1. A recording device for forming a permanent record within a well bore comprising, a frame, a cylindrical chart element mounted on the frame and constructed of a material having the property of transmitting light rays substantially longitudinally thereof without said rays being deflected or diffused to any appreciable extent in a direction transversely of the element, the outer surface of said element being capable of being scratched by a marking member, means for rotating the element in accordance with the movement of the device through the well bore, and a marking member engageable with the exterior surface of the chart element and movable relative thereto for scratching the surface of said element to form a graph thereon which is representative of the movements of said marking member.

2. A recording device for forming a permanent record comprising, a frame, a cylindrical chart element mounted on the frame and constructed of a material having the property of transmitting light rays substantially longitudinally thereof without said rays being deflected or diffused to any appreciable extent in a direction transversely of the element, the outer surface of said element being capable of being scratched by a marking member, means for rotating the element, and a marking member engageable with the exterior surface of the chart element and movable relative thereto for scratching the surface of said element to form a graph thereon which is representative of the movements of said marking member, the scratching on said surface and defining said graph functioning to permit escape of light rays transversely of the element, and a light sensitive sheet adapted to be placed adjacent the scratched element, whereby the projection of light rays longitudinally through the element will result in some of said rays being emitted through the scratching defining the graph to reproduce the graph on said light-sensitive sheet.

3. The combination with a marking stylus of a chart comprising an element constructed of a material capable of being scratched by the stylus, said material also having the property of transmitting light rays in one direction therethrough without any appreciable deflection or diffusion of said rays in a direction transversely of the path of transmission of said rays.

4. The combination with a marking stylus of a chart element comprising an elongate rod having a cylindrical surface and constructed of a material capable of being scratched by the stylus, said material also having the property of transmitting light rays substantially axially thereof without any appreciable deflection or diffusion of said rays in a direction transversely of said rod, and a light-sensitive sheet adapted to be placed adjacent the rod after the same has been scratched, whereby a portion of the light rays which are subsequently projected longitudinally through the rod escape outwardly in a direction transversely of the rod through the scratching to expose a portion of the sheet and reproduce said scratching.

5. The method of forming a permanent record of the internal surface condition of a well pipe comprising the steps of, lowering within the well pipe an elongate chart element which is constructed of a material which has the property of transmitting light rays longitudinally therethrough without any appreciable deflection or diffusion of a portion of the rays in a direction transversely of the element, making impressions upon the external surface of the elongate chart element while the chart element is within the well pipe, which impressions are representative of the variations in internal diameter of said pipe due to pits and irregularities of the inner pipe surface, removing the chart element having the impressions thereon from the well pipe, placing a light-sensitive medium adjacent the chart element, and thereafter directing light rays longitudinally through the chart element whereby a portion of said rays escape through the area of the impressions and are projected against the light-sensitive medium to expose a portion of the same to thereby reproduce said impressions on said medium.

MYRON M. KINLEY.
JOHN C. KINLEY.

References Cited in the file of this patent

UNITED STATES PATENTS

| Number | Name | Date |
| --- | --- | --- |
| 1,959,141 | Sperry | May 15, 1934 |
| 2,102,080 | Kinley | Dec. 14, 1937 |
| 2,156,289 | Hoy | May 2, 1939 |
| 2,188,821 | Rylsky | Jan. 30, 1940 |
| 2,207,117 | Collins | July 9, 1940 |
| 2,243,729 | Ellis | May 27, 1941 |
| 2,247,258 | Shepard | June 24, 1941 |
| 2,260,862 | O'Brien et al. | Oct. 28, 1941 |
| 2,297,851 | Wyss | Oct. 6, 1942 |
| 2,354,367 | Ford | July 25, 1944 |
| 2,358,102 | Robertson | Sept. 12, 1944 |
| 2,398,904 | Libman et al. | Apr. 23, 1946 |
| 2,469,423 | Wise et al. | May 10, 1949 |
| 2,506,500 | Hardy | May 2, 1950 |
| 2,539,009 | Chaney et al. | Jan. 23, 1951 |
| 2,563,119 | Kelly | Aug. 7, 1951 |

FOREIGN PATENTS

| Number | Country | Date |
| --- | --- | --- |
| 26,662 | Great Britain | Nov. 23, 1906 |

OTHER REFERENCES

Short, in "The Oil and Gas Journal," January 6, 1945, pages 46, 47. (Copy in library.)